United States Patent
Li et al.

(10) Patent No.: US 10,689,565 B2
(45) Date of Patent: Jun. 23, 2020

(54) BOOSTERS FOR BREAKERS CONTAINING IRON COMPOUNDS

(71) Applicant: Kemira Oyj, Helsinki (FI)

(72) Inventors: Jiang Li, Johns Creek, GA (US); Roopa Tellakula, Suwanee, GA (US)

(73) Assignee: Kemira OYJ, Helsinki (FI)

( * ) Notice: Subject to any disclaimer, the term of this patent is extended or adjusted under 35 U.S.C. 154(b) by 0 days.

(21) Appl. No.: 15/102,629

(22) PCT Filed: Dec. 30, 2014

(86) PCT No.: PCT/US2014/072666
§ 371 (c)(1),
(2) Date: Jun. 8, 2016

(87) PCT Pub. No.: WO2015/103201
PCT Pub. Date: Jul. 9, 2015

(65) Prior Publication Data
US 2016/0312109 A1    Oct. 27, 2016

Related U.S. Application Data

(60) Provisional application No. 61/922,507, filed on Dec. 31, 2013.

(51) Int. Cl.
| | |
|---|---|
| *E21B 43/26* | (2006.01) |
| *C09K 8/68* | (2006.01) |
| *E21B 43/267* | (2006.01) |
| *C09K 8/66* | (2006.01) |
| *C09K 8/72* | (2006.01) |
| *C09K 8/80* | (2006.01) |
| *C09K 8/88* | (2006.01) |

(52) U.S. Cl.
CPC ............... *C09K 8/68* (2013.01); *C09K 8/665* (2013.01); *C09K 8/725* (2013.01); *C09K 8/80* (2013.01); *C09K 8/882* (2013.01); *E21B 43/26* (2013.01); *E21B 43/267* (2013.01)

(58) Field of Classification Search
None
See application file for complete search history.

(56) References Cited

U.S. PATENT DOCUMENTS

| 3,370,650 A | 2/1968 | Watanabe |
| 5,358,043 A | 10/1994 | Moradi-Araghi |
| 2005/0061502 A1* | 3/2005 | Hanes, Jr. ............... C09K 8/56 166/278 |

(Continued)

OTHER PUBLICATIONS

International Search Report for PCT Patent Application No. PCT/US2014/072666, dated Mar. 10, 2015.

*Primary Examiner* — Andrew Sue-Ako
(74) *Attorney, Agent, or Firm* — Eversheds Sutherland (US) LLP

(57) ABSTRACT

Methods for fracturing a subterranean formation penetrated by a well bore are provided, the method comprising the step of injecting a well treatment fluid into the well bore at a pressure and flow rate sufficient to fracture the subterranean formation, wherein the well treatment fluid comprises one or more iron-containing compounds and one or more booster compounds. The methods can be used to reduce viscosity and to facilitate the decomposition of acrylamide-containing polymers.

18 Claims, 1 Drawing Sheet

(56) References Cited

U.S. PATENT DOCUMENTS

| | | | |
|---|---|---|---|
| 2005/0178553 A1* | 8/2005 | Harris | C09K 8/665 166/308.5 |
| 2009/0023613 A1* | 1/2009 | Li | C09K 8/528 507/211 |
| 2011/0214860 A1 | 9/2011 | Tonmukayakul et al. | |
| 2012/0058922 A1 | 3/2012 | Favero et al. | |

* cited by examiner

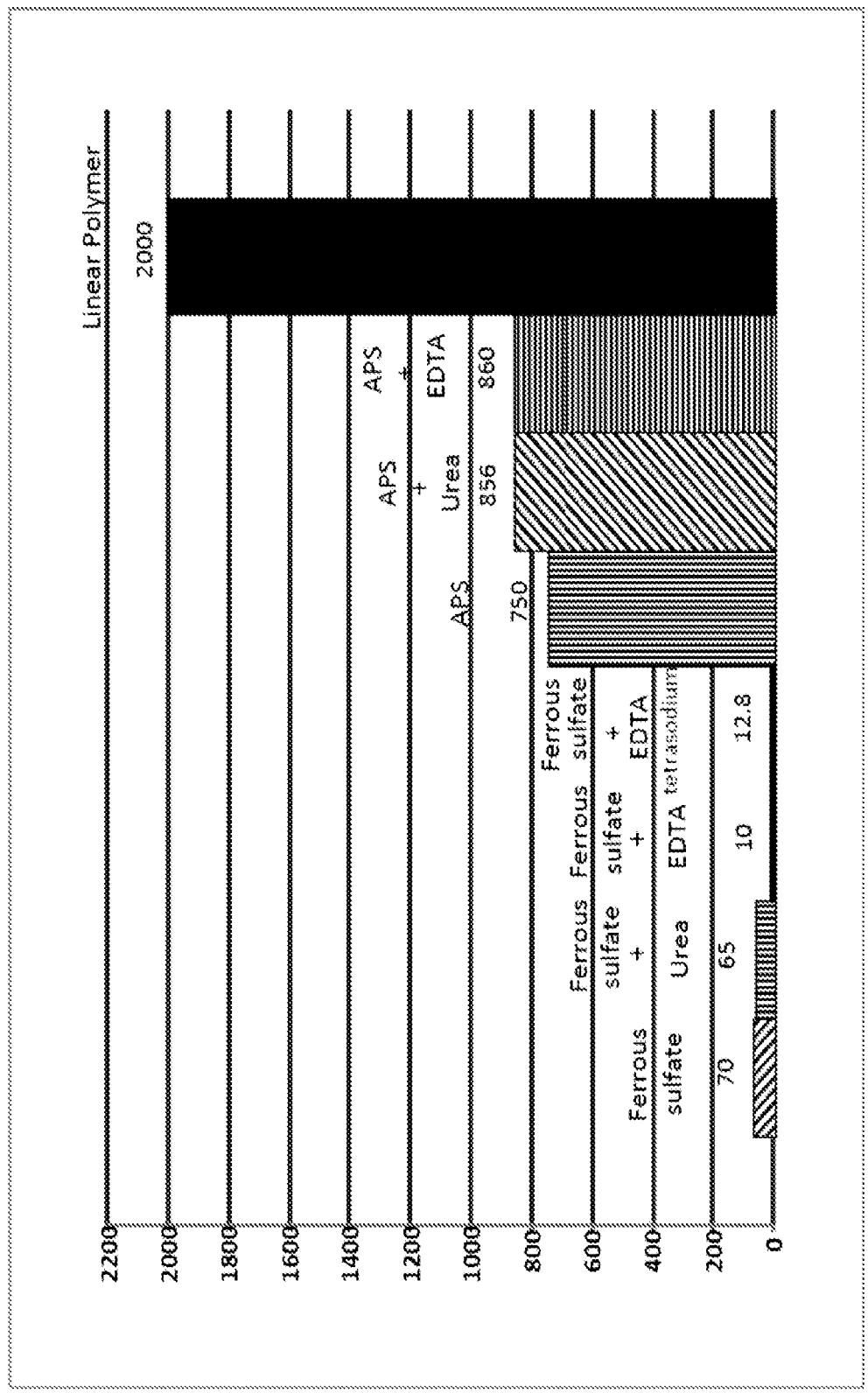

BOOSTERS FOR BREAKERS CONTAINING IRON COMPOUNDS

CROSS-REFERENCE TO RELATED APPLICATIONS

This application is a national stage application under 35 U.S.C. § 371 of International Application No. PCT/US2014/072666, filed Dec. 30, 2014, which claims priority to U.S. Provisional Patent Application No. 61/922,507, filed Dec. 31, 2013, each of which are incorporated herein by reference in their entirety.

FIELD OF THE ART

The present disclosure relates to boosters for breakers containing iron compounds and their methods of use in fracturing applications.

BACKGROUND

Fluids exhibit a measurable property known as viscosity, a term which may be broadly defined as the internal friction or molecular attraction of a given material which manifests itself in resistance to flow. It is measured in liquids by standard test procedures and is usually expressed in poise or centipoise (cP) at a specified temperature, although in oil technology it is sometimes expressed in seconds required for a given volume to flow through a specified orifice at a definite temperature. The viscosity of a fluid is an indication of a number of behavior patterns of the liquid at a given temperature including pumping characteristics, rate of flow, wetting properties, and a tendency or capacity to suspend an insoluble particulate material.

There are a number of industrial operations wherein it is desirable to employ viscous aqueous solutions. For example, viscous aqueous solutions are employed to fracture subterranean formations penetrated by a borehole for increasing the production of petroleum fluids, namely crude oil and natural gas. Viscous aqueous solutions are also employed in the secondary recovery of oil from oil bearing subterranean formations by fluid drive processes.

It is common practice to treat subterranean formations to increase the permeability or conductivity of such formations by procedures that are identified generally as fracturing processes. For example, it is a conventional practice to hydraulically fracture a well in order to produce one or more cracks or "fractures" in the surrounding formation by mechanical breakdown of the formation. Fracturing may be carried out in wells that are completed in subterranean formations for virtually any purpose. The usual candidates for fracturing, or other stimulation procedures, are production wells completed in oil and/or gas containing formations. However, disposal wells and injection wells used in secondary or tertiary recovery operations, for example, for the injection of water or gas, may also be fractured in order to facilitate the injection of fluids into such subterranean formations.

Hydraulic fracturing is accomplished by injecting a well treatment fluid into the well and applying sufficient pressure on the well treatment fluid to cause the formation to break down with the attendant production of one or more fractures. Usually a gel, an emulsion or a foam having a proppant such as sand or other particulate material suspended therein is introduced into the fractures. The proppant is deposited in the fractures and functions to hold the fractures open after the pressure is released and the well treatment fluid flows back to the surface. The well treatment fluid must have a sufficiently high viscosity to retain the proppant in suspension or at least to reduce the tendency of the proppant to settle out as it flows along the created fracture. Viscosifiers, such as a polysaccharide or a polyacrylamide, are often used to gel the well treatment fluid to provide the high viscosity needed to retain the proppant in suspension.

After the high viscosity well treatment fluid has been pumped into the formation and fracturing of the formation has occurred, it is desirable to remove the fluid from the formation to allow hydrocarbon production through the new fractures. Generally, the removal of the highly viscous well treatment fluid is realized by "breaking" the gel, i.e. converting the well treatment fluid into a low viscosity fluid. Breaking the gelled well treatment fluid has commonly been accomplished by adding a "breaker," that is, a viscosity-reducing agent, to the well treatment fluid prior to pumping into the subterranean formation.

Acrylamide-containing polymers are often added to well treatment fluids in oilfield applications to reduce friction or to modify rheological properties of the fluid. Such polymers may persist in the fluid or formation for an extended period of time. The polymer residue may plug some of the permeability of the rock, hinder recovery of the water used in the well treatment fluid, or hinder a source of nitrogen that can support the growth of bacteria in the well. In order to facilitate removal of these polymers after the task has been completed, treatments involving oxidizer-based breakers, for example persulfate salts, may be applied. Breakers can be used in this manner to generate smaller polymeric fragments with more benign environmental profile.

SUMMARY

Disclosed herein is a method for fracturing a subterranean formation penetrated by a well bore, the method comprising the step of injecting a well treatment fluid into the well bore at a pressure and flow rate sufficient to fracture the subterranean formation, wherein the well treatment fluid comprises water, at least one acrylamide-containing polymer, one or more iron-containing compounds and one or more booster compounds. A method for fracturing a subterranean formation penetrated by a well bore is also provided, the method comprising the steps of (i) injecting a first well treatment fluid comprising at least one acrylamide-containing polymer into the well bore at a pressure and flow rate sufficient to fracture the subterranean formation; and (ii) injecting a second well treatment fluid comprising one or more iron-containing compounds and one or more booster compounds into the well bore. Further, a method for fracturing a subterranean formation penetrated by a well bore is also provided, the method comprising the steps of (i) injecting a first well treatment fluid comprising at least one acrylamide-containing polymer into the well bore at a pressure and flow rate sufficient to fracture the subterranean formation; (ii) injecting a second well treatment fluid comprising one or more iron-containing compounds; and (iii) injecting a third well treatment fluid comprising one or more booster compounds into the well bore.

A well treatment fluid comprising water, one or more iron-containing compounds, one or more booster compounds, and at least one acrylamide-containing polymer, is also disclosed herein.

Methods for reducing the viscosity of a well treatment fluid are also provided, each method comprising adding one or more iron-containing compounds and one or more booster compounds to the well treatment fluid, wherein the well treatment fluid comprises water and at least one acrylamide-containing polymer

BRIEF DESCRIPTION OF THE DRAWING

FIG. 1 is a graph of the viscosity (cP) after breaking with exemplary iron-containing compounds or commercially available breakers, alone or in combination with exemplary booster compounds.

DETAILED DESCRIPTION

Disclosed herein are well treatment fluids and methods of use which include one or more iron-containing compounds and one or more booster compounds. The exemplary combinations of the one or more iron-containing compounds and one or more booster compounds may be used to reduce the viscosity of a well treatment fluid as used, for example in methods of fracturing subterranean formations. The exemplary combinations can be used in aqueous fluids, including well treatment fluids, to reduce the molecular weight of an acrylamide-based polymer contained in the fluid. The exemplary combinations and methods can be used advantageously to facilitate the breakdown of acrylamide-based polymers into smaller fragments. The methods may be readily incorporated into current processing facilities and may provide economic and environmental benefits.

Breakers and Breaker Compositions

As used herein, the term "breaker" refers any compound or mixture of compounds which reduces the viscosity of the well treatment fluid. In exemplary embodiments, the breaker is one or more iron-containing compounds, for example a ferrous compound, ferrous salt, ferric compound, ferric salt, and mixtures thereof. In exemplary embodiments, the ferrous salt is, for example, a ferrous salt having an organic anion, a ferrous salt having an inorganic anions, or a mixture thereof. In exemplary embodiments, the breaker or ferrous salt is ferrous chloride, ferrous bromide, ferrous fluoride, ferrous sulfate, ammonium iron sulfate and combinations thereof. In exemplary embodiments, the ferrous salt breaker comprises ferrous sulfate.

In exemplary embodiments, the ferric salt is, for example, a ferric salt having an organic anion, a ferric salt having an inorganic anions, or a mixture thereof. In exemplary embodiments, the breaker or ferric salt is ferric citrate, ferric chloride, ferric bromide, ferric fluoride, ferric sulfate, and combinations thereof. In exemplary embodiments, the ferric salt breaker comprises ferric citrate.

In exemplary embodiments, the breaker may be used or combined with other breakers, for example ammonium sulfate, ammonium persulfate, enzymes, copper compounds, ethylene glycol, glycol ethers and combinations thereof. In exemplary embodiments, the breaker comprises ferrous citrate in combination with ammonium persulfate. In exemplary embodiments, the breaker comprises ferrous sulfate in combination with ammonium persulfate.

In exemplary embodiments, the breaker may be used to facilitate decomposition of an acrylamide-containing polymer or gel composition. In exemplary embodiments, the breaker may be used to reduce the viscosity of an acrylamide-containing polymer or gel composition. In exemplary embodiments, the breaker may be used to facilitate decomposition of a gel composition or acrylamide-containing polymer into oligomeric fragments.

In exemplary embodiments, a breaker composition may consist essentially of one or more iron-containing compounds or may comprise the one or more iron-containing compounds, solvents, diluents, other breakers, and/or other suitable additives.

In exemplary embodiments, the breaker composition may comprise, or be used in combination with, one or more compounds or agents which may enhance or boost the performance of the breaker composition, e.g. booster compounds. Exemplary booster compounds may be used to enhance the rate of breaking compared to the rate of the breaker compound or composition in the absence of booster compounds. For example, booster compounds include, but are not limited to, urea; ethylenediaminetetraacetic acid (EDTA); salts of EDTA, e.g. sodium salts of EDTA; or other chelating agents such as citric acid, aminotricarboxylic acid and its salts, polyphosphonated and poly phosphate compounds, boric acid and its salts, alkali metal salts of carbonates, diethylenetriaminepentaacetic acid (DTPA), humic acids, and lignosulfates. Polyphosphonates include, for example, ethylenediaminetetra(methylenephosphonic acid); 1-hydroxyethylidene-1, 1-diphosphonic acid and aminotri (methylene phosphonic acid) and their salts. Examples of polyphosphates include adducts made from the reaction of polyhedric solvents such as glycerin and ethylene glycol with $P_2O_5$ to form polyphosphated mixtures. In a particular embodiment, the booster compound is urea, EDTA or a salt of EDTA. In another particular embodiment, the booster compound is a sodium salt of EDTA.

Acrylamide-Containing Polymers

In exemplary embodiments, the breaker may be used to facilitate decomposition of an acrylamide-containing polymer or gel composition, for example decomposition of an acrylamide-containing polymer into oligomeric fragments.

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units. A polymer may also be linear, branched or crosslinked.

As used herein, the term "acrylamide-containing polymer" includes acrylamide homopolymers, copolymers, and terpolymers; polyacrylamide; polyacrylamide derivatives; partially hydrolyzed polyacrylamide; partially hydrolyzed polyacrylamide derivatives; methacrylamide homopolymers, copolymers, and terpolymers; diacetone acrylamide polymers; N-methylolacrylamide polymers; friction-reducing acrylamide polymers; and combinations thereof. In exemplary embodiments, the acrylamide-containing polymer may contain any suitable monomers, for example vinyl acetate, N-vinylformamide, N-vinylacetamide, N-vinylcaprolactam, N-vinylimidazole, N-vinylpyridine, 2-acrylamido-2-methylpropanesulfonic acid (AMPS), N-vinylpyrolidone, acrylamidopropyltrimonium chloride, or combinations thereof.

In exemplary embodiments, the acrylamide-containing polymer is a copolymer. In exemplary embodiments, the copolymer contains about 1 to about 99, about 5 to about 95, about 10 to about 90, about 20 to about 80, about 30 to about 70, about 40 to about 60 weight percent of acrylamide, methyacrylamide or acrylamide derivatives.

In exemplary embodiments, the acrylamide-containing polymer is a friction reducer or friction-reducing polymer. As used herein, the term "friction reducer" or "friction-reducing polymer" is a compound or composition of compounds which reduces the friction between the well treatment fluid and pipe and/or allows pumps to pump at a higher rate without having greater pressure on the surface. In exemplary embodiments, the friction reducer comprises an acrylamide-containing polymer, for example polyacrylamide, polyacrylamide derivatives, and combinations thereof.

In exemplary embodiments, the friction reducer further comprises other suitable polymers selected from the group consisting of polyacrylic acids, polyacrylic salts, acrylate copolymers containing acrylamide, acrylonitrile and combinations thereof. Other suitable polymers will be apparent to those of skill in the art and are to be considered within the scope of the present invention.

In exemplary embodiments, the acrylamide-containing polymer is a viscosifier. As used herein, the term "viscosifier" refers to a compound or composition of compounds which increases the viscosity of the well treatment fluid. In exemplary embodiments, the viscosifier comprises a thickening polymer such as a hydratable polymer such as, for example, one or more polymer capable of forming linear or crosslinked gels.

In exemplary embodiments, the at least one acrylamide-containing polymer is in the form of a polymer composition or gel composition. In exemplary embodiments, the at least one acrylamide-containing polymer may be crosslinked or in the presence of crosslinking agents in a polymer composition or gel composition.

Well Treatment Fluids

As used herein, the terms "well treatment fluid", "pressurized fluid" or "fracturing fluid" refer to a fluid composition that useful in oil field applications including, for example, low-volume hydraulic fracturing, high-volume hydraulic fracturing, slick water fracturing and well stimulation; for oil, gas or geothermal energy wells, as well as cleanup related thereto. In exemplary embodiments, the well treatment fluid can be an aqueous fluid, gel, foam or slick water-based. In exemplary embodiments, the well treatment fluid is of sufficient viscosity to facilitate fracturing of a formation.

In exemplary embodiments, a well treatment fluid comprises one or more iron-containing compounds and one or more booster compounds. In exemplary embodiments, the one or more booster compounds are selected from the group consisting of: urea; EDTA; salts of EDTA; citric acid; aminotricarboxylic acid and its salts; polyphosphonated and poly phosphate compounds; boric acid and its salts; alkali metal salts of carbonates, diethylenetriaminepentaacetic acid (DTPA), humic acids, and lignosulfates. In exemplary embodiments, the well treatment fluid further comprises water and at least one acrylamide-containing polymer.

In exemplary embodiments, the well treatment fluid is used in a hydraulic fracturing application before, with or after other well treatment fluids. Other well treatment fluids include, for example, a well treatment fluid that comprises water and at least one acrylamide-containing polymer. In exemplary embodiments, the well treatment fluid may further comprise other viscosifiers, other friction reducers, proppants, acids, sodium chloride, emulsifiers, sodium and potassium carbonates, biocides, anti-scaling compounds, corrosion preventing compounds, or other suitable additives.

In exemplary embodiments, the well treatment fluid comprises water, wherein the water is selected from fresh water, brine, aqueous-based foams, water-alcohol mixtures, and combinations thereof.

In exemplary embodiments, the at least one acrylamide-containing polymer is in an amount of about 0.001% to about 5%, 0.001% to about 1%, 0.001% to about 0.5%, about 0.001% to about 0.4%, or about 0.001% to about 0.2 of the well treatment fluid volume.

In exemplary embodiments, the amount of the one or more iron-containing compounds in the well treatment fluid is about 0.001% to about 0.2, 0.001% to about 0.1%, about 0.001% to about 0.05%, or about 0.075% to about 0.02% of the well treatment fluid volume.

In exemplary embodiments, the amount of the one or more booster compounds in the well treatment fluid is about 0.001% to about 0.2%, 0.001% to about 0.1%, or about 0.001% to about 0.05 of the well treatment fluid volume.

In exemplary embodiments, the one or more iron-containing compounds and the one or more booster compounds in the well treatment fluid are present in substantially equivalent amounts by mole.

In exemplary embodiments, the acrylamide-containing polymer is in the form of dry powder or carried (suspended) in liquid such as petroleum distillate or mineral oil. In exemplary embodiments, the acrylamide-containing polymer may be added in a breaker-free stage or a breaker-laden stage. In exemplary embodiments, when present in the same stage as the breaker, the breaker exhibits some affinity towards the friction reducer. In exemplary embodiments, the acrylamide-containing polymer may be added in a viscosifier-free stage or a viscosifier-laden stage.

In addition to friction reducers, viscosifiers, breakers and proppants, several other additives used in the oil industry and known in the art may be added to a well treatment fluid. In exemplary embodiments, the well treatment fluid may further comprise acids, hydrochloric acid, acetic acid, sodium chloride, ethylene glycol, scale reducers, sodium carbonate, potassium carbonate, biocides, crosslinking agents, corrosion inhibitors, citric acid, non-emulsifiers, emulsifiers, iron control agents, delay additives, silt suspenders, flowback additives, isopropanol, methanol, and combinations thereof.

In exemplary embodiments, the well treatment fluid comprises one or more viscosifiers. In exemplary embodiments, the well treatment fluid comprises one or more viscosifiers that is an acrylamide-containing polymer. In exemplary embodiments, the well treatment fluid comprises one or more viscosifiers that is a hydratable polymer, for example galactomannan gums, guars, derivatized guars, cellulose and cellulose derivatives, starch, starch derivatives, xanthan, derivatized xanthan and mixtures thereof. In exemplary embodiments, the viscosifier comprises a hydratable polymer selected form the group consisting of guar gum, guar gum derivative, locust bean gum, welan gum, karaya gum, xanthan gum, scleroglucan, diutan, cellulose, cellulose derivatives and combinations thereof. In exemplary embodiments, the viscosifier comprises a hydratable polymer selected form the group consisting of hydroxypropyl guar (HPG), carboxymethyl hydroxypropyl guar (CMHPG), hydroxyethyl cellulose (HEC), carboxymethyl hydroxyethyl cellulose (CMHEC), carboxymethyl cellulose (CMC), dialkyl carboxymethyl cellulose, and combinations thereof. In exemplary embodiments, the viscosifier is selected form the group consisting of phosphomannans, scerolglucans, dextrans and combinations thereof.

In exemplary embodiments, the well treatment fluid comprises a crosslinking agent. In exemplary embodiments, any crosslinking agent suitable for crosslinking the hydratable polymer may be employed. In exemplary embodiments, suitable crosslinking agents can be any conventionally used crosslinking agents which are known to those skilled in the art. In exemplary embodiments, suitable crosslinking agents include borate crosslinkers. In exemplary embodiments, suitable crosslinking agents include metal ions such as aluminum, antimony, zirconium and titanium-containing compounds, including organotitanates.

In exemplary embodiments, the viscosifier is a guar or derivatized guar. In exemplary embodiments, suitable crosslinkers for guar based polymers include borate ion donating materials. In exemplary embodiments, borate-based crosslinkers include, but are not limited to, organo-borates, mono-borates, poly-borates, mineral borates, and combinations thereof.

In exemplary embodiments, the viscosifier can be in the form of dry powder, carried (suspended) in liquid or dissolved in a liquid. In exemplary embodiments, the viscosifier may be added in a breaker-free stage or a breaker-laden stage. In exemplary embodiments, when present in the same stage as the breaker, the breaker exhibits some affinity towards the viscosifier. In exemplary embodiments, the viscosifier may be added in a proppant-free stage or a proppant-laden stage. In exemplary embodiments, the viscosifier may be added in a friction reducer-free stage or a friction reducer-laden stage.

Methods

In exemplary embodiments, methods are provided for fracturing a subterranean formation penetrated by a well bore, comprising the step of injecting a well treatment fluid into the well bore at a pressure and flow rate sufficient to fracture the subterranean formation, wherein the well treatment fluid comprises water, at least one acrylamide-containing polymer, a breaker comprising one or more iron-containing compounds and one or more booster compounds. In exemplary embodiments, the well treatment fluid is a hydraulic fracturing fluid.

In exemplary embodiments, methods are provided for fracturing a subterranean formation penetrated by a well bore, comprising the steps of (i) injecting a first well treatment fluid comprising at least one acrylamide-containing polymer into the well bore at a pressure and flow rate sufficient to fracture the subterranean formation; and (ii) injecting a second well treatment fluid comprising one or more iron-containing compounds and one or more booster compounds into the well bore. In exemplary embodiments, the first well treatment fluid is injected into the well bore before the second well treatment fluid. In exemplary embodiments, the first well treatment fluid is injected into the well bore substantially at the same time as the second well treatment fluid. In exemplary embodiments, the first well treatment fluid is injected into the well bore after the second well treatment fluid.

In exemplary embodiments, methods are provided for fracturing a subterranean formation penetrated by a well bore, comprising the steps of (i) injecting a first well treatment fluid comprising at least one acrylamide-containing polymer into the well bore at a pressure and flow rate sufficient to fracture the subterranean formation; (ii) injecting a second well treatment fluid comprising one or more iron-containing compounds; and (iii) injecting a third well treatment fluid comprising one or more booster compounds into the well bore. In exemplary embodiments, the first well treatment fluid is injected into the well bore before the second or third well treatment fluids. In exemplary embodiments, the first well treatment fluid is injected into the well bore substantially at the same time as the second and third well treatment fluids. In exemplary embodiments, the first well treatment fluid is injected into the well bore after the second and third well treatment fluids. In exemplary embodiments, the second well treatment fluid is injected into the well bore substantially at the same time as the third well treatment fluids. In exemplary embodiments, the first well treatment fluid comprising at least one acrylamide-containing polymer is injected into the well bore before the second well treatment fluid comprising one or more iron-containing compounds is injected into the well bore. In exemplary embodiments, the second well treatment fluid comprising one or more iron-containing compounds is injected into the well bore before the third well treatment fluid comprising one or more booster compounds is injected into the well bore. In exemplary embodiments, the injection of a composition or well treatment fluid as described herein immediately follows the injection of another composition or well treatment fluid, e.g. without delay. In exemplary embodiments, the injection of a composition or well treatment fluid as described herein follows the injection of another composition or well treatment fluid within about 5 minutes, about 4, minutes, about 3 minutes, about 2 minutes or about 1 minute.

In exemplary embodiments, the first well treatment fluid further comprises a proppant. In exemplary embodiments, the second well treatment fluid further comprises a proppant. In exemplary embodiments, the third well treatment fluid further comprises a proppant.

In exemplary embodiments, the at least one acrylamide-containing polymer is injected into the well bore before the injection of the one or more iron-containing compound and one or more booster compounds to the well treatment. In exemplary embodiments, methods are provided for reducing the viscosity of a well treatment fluid comprising adding one or more iron-containing compound and one or more booster compounds to the well treatment fluid, wherein the well treatment fluid comprises water and at least one acrylamide-containing polymer.

In exemplary embodiments, methods for enhancing the biodegradation of a well treatment fluid are provided, comprising adding one or more iron-containing compounds and one or more booster compounds to the well treatment fluid, wherein the well treatment fluid comprises water and at least one acrylamide-containing polymer.

In exemplary embodiments, the one or more iron-containing compounds and one or more booster compounds reduces the viscosity of the well treatment fluid over a period of time. In exemplary embodiments, the one or more iron-containing compounds and one or more booster compounds reduces the molecular weight of at least one acrylamide-containing polymer. In exemplary embodiments, the one or more iron-containing compounds and one or more booster compounds generates fragments of the at least one acrylamide-containing polymer, for example biodegradable or oligomeric fragments. In exemplary embodiments, the addition of the one or more iron-containing compounds and one or more booster compounds results in decreasing the viscosity of the well treatment fluid.

In exemplary embodiments, the one or more iron-containing compounds can be in the form of dry powder, carried (suspended) in liquid or dissolved in a liquid. In exemplary embodiments, the one or more booster compounds can be in the form of dry powder, carried (suspended) in liquid or dissolved in a liquid.

In exemplary embodiments, the method further comprises injecting one or more additional breakers, for example ammonium sulfate, ammonium persulfate, enzymes, copper compounds, ethylene glycol, glycol ethers and combinations thereof.

In exemplary embodiments, the one or more iron-containing compounds may be added in a viscosifier-free stage or a viscosifier-laden stage. In exemplary embodiments, when present in the same stage as the viscosifier, the one or more iron-containing compounds exhibits some affinity towards the viscosifier. In exemplary embodiments, the one or more iron-containing compounds may be added in a proppant-free stage or a proppant-laden stage. In exemplary embodiments, the one or more iron-containing compounds may be added in a friction reducer-free stage or a friction reducer-laden stage. In exemplary embodiments, when present in the same stage as the friction reducer, the one or more iron-containing compounds exhibits some affinity towards the friction reducer.

In exemplary embodiments, the one or more booster compounds may be added in a viscosifier-free stage or a viscosifier-laden stage. In exemplary embodiments, when present in the same stage as the viscosifier, the one or more booster compounds exhibits some affinity towards the viscosifier. In exemplary embodiments, the one or more booster compounds may be added in a proppant-free stage or a proppant-laden stage. In exemplary embodiments, the one or more booster compounds may be added in a friction reducer-free stage or a friction reducer-laden stage. In exemplary embodiments, when present in the same stage as the friction reducer, the one or more booster compounds exhibits some affinity towards the friction reducer.

In exemplary embodiments, the one or more iron-containing compounds and one or more booster compounds generates oligomeric fragments of the acrylamide-containing polymer. In exemplary embodiments, the oligomeric fragments of the acrylamide-containing polymer generated by one or more iron-containing compounds and one or more booster compounds are biodegradable. In exemplary embodiments, the one or more iron-containing compounds and one or more booster compounds generates oligomeric fragments of the acrylamide-containing polymer having a molecular weight of less than about 400,000, about 300,000, or about 200,000 g/mol.

In exemplary embodiments, the viscosity of the well treatment fluid with the one or more iron-containing compounds and one or more booster compounds is less than the viscosity of well treatment fluid without the one or more iron-containing compounds and one or more booster compounds.

In exemplary embodiments, the decrease in the viscosity of the well treatment fluid allows for easier recovery of the well treatment fluid. In exemplary embodiments, the viscosity of the well treatment fluid with the one or more iron-containing compounds and one or more booster compounds is less than the viscosity of well treatment fluid with the one or more iron-containing compounds but without the one or more booster compounds.

In exemplary embodiments, the one or more iron-containing compounds and one or more booster compounds reduce the viscosity of the well treatment fluid faster than conventional breakers. In exemplary embodiments, the one or more iron-containing compounds and one or more booster compounds reduce the viscosity of the well treatment fluid faster than ammonium persulfate. In exemplary embodiments, the one or more iron-containing compounds and one or more booster compounds acting on the well treatment fluid increases the fracture conductivity within the formation.

In exemplary embodiments, the one or more iron-containing compounds and one or more booster compounds reduce the viscosity of the well treatment fluid to less than about 10 cP at a shear rate of 10 s$^{-1}$, about 5 cP at a shear rate of 10 s$^{-1}$, about 2 cP at a shear rate of 10 s$^{-1}$, about 20 cP at a shear rate of 100 s$^{-1}$, about 10 cP at a shear rate of 10 s$^{-1}$, or about 3 cP at a shear rate of 10 s$^{-1}$.

Suitable adjustments to the ratios of the components that will affect the conditions in which the viscosity of the well treatment fluid is reduced, or in which the acrylamide-containing polymer breaks down, will be apparent to those of skill in the art.

In exemplary embodiments, the one or more iron-containing compounds and one or more booster compounds initiates breaking at ambient temperatures. In exemplary embodiments, the one or more iron-containing compounds and one or more booster compounds initiates breaking under heating.

In the exemplary embodiments, the well treatment fluid may be handled or processed in any manner as necessary or desired. In exemplary embodiments, the well treatment fluid should be handled in compliance with governmental regulations. In exemplary embodiments, the well treatment fluid may be disposed of, processed for environmental remediation, or recycled. In the exemplary embodiments, the one or more iron-containing compounds and one or more booster compounds may be used in the disposal, environmental remediation or recycling of the well treatment fluid. In the exemplary embodiments, recycled well treatment fluid may be used at any point where well treatment fluid is used.

EXAMPLES

Example 1

Effect of Combinations of Exemplary Booster Compounds Iron-Containing Compounds and Commercially Available Breakers on the Viscosity of Polyacrylamide Solutions In this example, reduction in the viscosity of a well treatment fluid was examined by treatment with exemplary iron-containing breaker compounds (Ferrous Sulfate, commercially available from Fisher Scientific) or commercially available (comparative) breakers (Ammonium persulfate (APS), commercially available from Fisher Scientific), with or without exemplary booster compounds (urea, EDTA, EDTA tetrasodium, all commercially available from Fisher Scientific).

Several polymer samples were prepared using a solution of 0.4 wt % partially hydrolyzed polyacrylamide (based on actives, available from Kemira Oyj). The samples were prepared by mixing the breaker and booster compounds (as indicated) (either as a 1% solution in water or as a powder)

with the partially hydrolyzed polyacrylamide solution. The iron-containing breakers or the comparative breakers were added to the samples to provide 0.01 wt % of breaker to the sample formulation. When included in a formulation, booster compounds were added to provide 0.01 wt % booster to the sample formulation. One control sample (labeled "linear polymer" was prepared without breaker or booster compounds.

Each sample was heated at 150° F. for about 1 hour. The samples were subsequently cooled to ambient temperature before analysis. The viscosity of each sample was determined at 12 rpm at 72° F. in the Brookfield viscometer. The resulting viscosity of the samples is graphically illustrated in FIG. 1.

In the preceding specification, various exemplary embodiments have been described. It will, however, be evident that various modifications and changes may be made thereto, and additional embodiments may be implemented, without departing from the broader scope of the exemplary embodiments as set forth in the claims that follow. The specification and drawings are accordingly to be regarded in an illustrative rather than restrictive sense.

We claim:

1. A method for fracturing a subterranean formation penetrated by a well bore, the method comprising the step of injecting a well treatment fluid into the well bore at a pressure and flow rate sufficient to fracture the subterranean formation, wherein the well treatment fluid comprises:
   water;
   at least one acrylamide-containing polymer in an amount of about 0.001% to about 5% of the well treatment fluid volume;
   a ferrous salt in an amount of about 0.001% to about 0.05% of the well treatment fluid volume;
   and one or more booster compounds in an amount of about 0.001% to about 0.05% of the well treatment fluid volume; and
   wherein the one or more booster compounds are selected from the group consisting of urea; ethylenediaminetetraacetic acid (EDTA); salts of EDTA; citric acid; aminotricarboxylic acid and its salts; polyphosphonated and poly phosphate compounds; boric acid and its salts; alkali metal salts of carbonates; diethylenetriaminepentaacetic acid (DTPA); humic acids; and lignosulfates; and wherein the combination of the ferrous salt and the one or more booster compounds constitute a breaker composition sufficient to facilitate the breakdown of the at least one acrylamide-containing polymer in the absence of an oxidizer-based breaker.

2. The method of claim 1, wherein the ferrous salt is selected from the group consisting of ferrous chloride, ferrous bromide, ferrous fluoride, ferrous sulfate, ammonium iron sulfate and combinations thereof.

3. The method of claim 1, wherein the ferrous salt comprises ferrous chloride.

4. The method of claim 1, wherein the ferrous salt comprises ferrous sulfate.

5. The method of claim 1, wherein the one or more booster compounds are selected from the group consisting of urea; ethylenediaminetetraacetic acid (EDTA); and salts of EDTA.

6. The method of claim 1, wherein the at least one acrylamide-containing polymer is selected from the group consisting of: acrylamide homopolymers, copolymers, and terpolymers; polyacrylamide; polyacrylamide derivatives; methacrylamide homopolymers, copolymers, and terpolymers; diacetone acrylamide polymers; N-methylolacrylamide polymers; and combinations thereof.

7. A method for fracturing a subterranean formation penetrated by a well bore, the method comprising the steps of (i) injecting a first well treatment fluid comprising at least one acrylamide-containing polymer into the well bore at a pressure and flow rate sufficient to fracture the subterranean formation; and (ii) injecting a second well treatment fluid comprising a ferrous salt and one or more booster compounds into the well bore;
   wherein the at least one acrylamide-containing polymer is in an amount of about 0.001% to about 5% of the well treatment fluid volume;
   wherein the ferrous salt is in an amount of about 0.001% to about 0.05% of the well treatment fluid volume;
   wherein the one or more booster compounds are in an amount of about 0.001% to about 0.05% of the well treatment fluid volume;
   wherein the one or more booster compounds are selected from the group consisting of urea; ethylenediaminetetraacetic acid (EDTA); salts of EDTA; citric acid; aminotricarboxylic acid and its salts; polyphosphonated and poly phosphate compounds; boric acid and its salts; alkali metal salts of carbonates; diethylenetriaminepentaacetic acid (DTPA); humic acids; and lignosulfates; and
   wherein the combination of the ferrous salt and the one or more booster compounds constitute a breaker composition sufficient to facilitate the breakdown of the at least one acrylamide-containing polymer in the absence of an oxidizer-based breaker.

8. The method of claim 7, wherein the first well treatment fluid further comprises a proppant.

9. The method of claim 7, wherein the second well treatment fluid further comprises a proppant.

10. The method of claim 7, wherein the ferrous salt is selected from the group consisting of ferrous chloride, ferrous bromide, ferrous fluoride, ferrous sulfate, ammonium iron sulfate and combinations thereof.

11. The method of claim 7, wherein the one or more booster compounds are selected from the group consisting of urea; ethylenediaminetetraacetic acid (EDTA); and salts of EDTA.

12. A method for fracturing a subterranean formation penetrated by a well bore, the method comprising the steps of (i) injecting a first well treatment fluid comprising at least one acrylamide-containing polymer into the well bore at a pressure and flow rate sufficient to fracture the subterranean formation; (ii) injecting a second well treatment fluid comprising a ferrous salt and (iii) injecting a third well treatment fluid comprising one or more booster compounds into the well bore;
   wherein the at least one acrylamide-containing polymer is in an amount of about 0.001% to about 5% of the well treatment fluid volume;
   wherein the ferrous salt is in an amount of about 0.001% to about 0.05% of the well treatment fluid volume;
   wherein the one or more booster compounds are in an amount of about 0.001% to about 0.05% of the well treatment fluid volume;
   wherein the one or more booster compounds are selected from the group consisting of urea; ethylenediaminetetraacetic acid (EDTA); salts of EDTA; citric acid; aminotricarboxylic acid and its salts; polyphosphonated and poly phosphate compounds; boric acid and its salts; alkali metal salts of carbonates; diethylenetriaminepentaacetic acid (DTPA); humic acids; and lignosulfates; and wherein the combination of the ferrous salt and the one or more booster compounds constitute a breaker composition sufficient to facilitate the breakdown of the at least one acrylamide-containing polymer in the absence of an oxidizer-based breaker.

13. The method of claim 12, wherein the third well treatment fluid further comprises a proppant.

14. The method of claim 12, wherein the first well treatment fluid further comprises a proppant.

15. The method of claim 12, wherein the second well treatment fluid further comprises a proppant.

16. The method of claim 12, wherein the ferrous salt is selected from the group consisting of ferrous chloride, ferrous bromide, ferrous fluoride, ferrous sulfate, ammonium iron sulfate and combinations thereof.

17. The method of claim 12, wherein the one or more booster compounds are selected from the group consisting of urea; ethylenediaminetetraacetic acid (EDTA); and salts of EDTA.

18. A method for reducing the viscosity of a well treatment fluid, the method comprising adding a ferrous salt and one or more booster compounds to the well treatment fluid, wherein the well treatment fluid comprises water and at least one acrylamide-containing polymer;

wherein the at least one acrylamide-containing polymer is in an amount of about 0.001% to about 5% of the well treatment fluid volume;

the ferrous salt is in an amount of about 0.001% to about 0.05% of the well treatment fluid volume; the one or more booster compounds are in an amount of about 0.001% to about 0.05% of the well treatment fluid volume;

wherein the one or more booster compounds are selected from the group consisting of urea; ethylenediaminetetraacetic acid (EDTA); salts of EDTA; citric acid; aminotricarboxylic acid and its salts; polyphosphonated and poly phosphate compounds; boric acid and its salts; alkali metal salts of carbonates; diethylenetriaminepentaacetic acid (DTPA); humic acids; and lignosulfates; and wherein the combination of the ferrous salt and the one or more booster compounds constitute a breaker composition sufficient to facilitate the breakdown of the at least one acrylamide-containing polymer in the absence of an oxidizer-based breaker.

* * * * *